Nov. 17, 1964      F. S. HUMMEL      3,157,579
NUCLEAR REACTOR FUELING MACHINE
Filed March 5, 1962      6 Sheets-Sheet 1
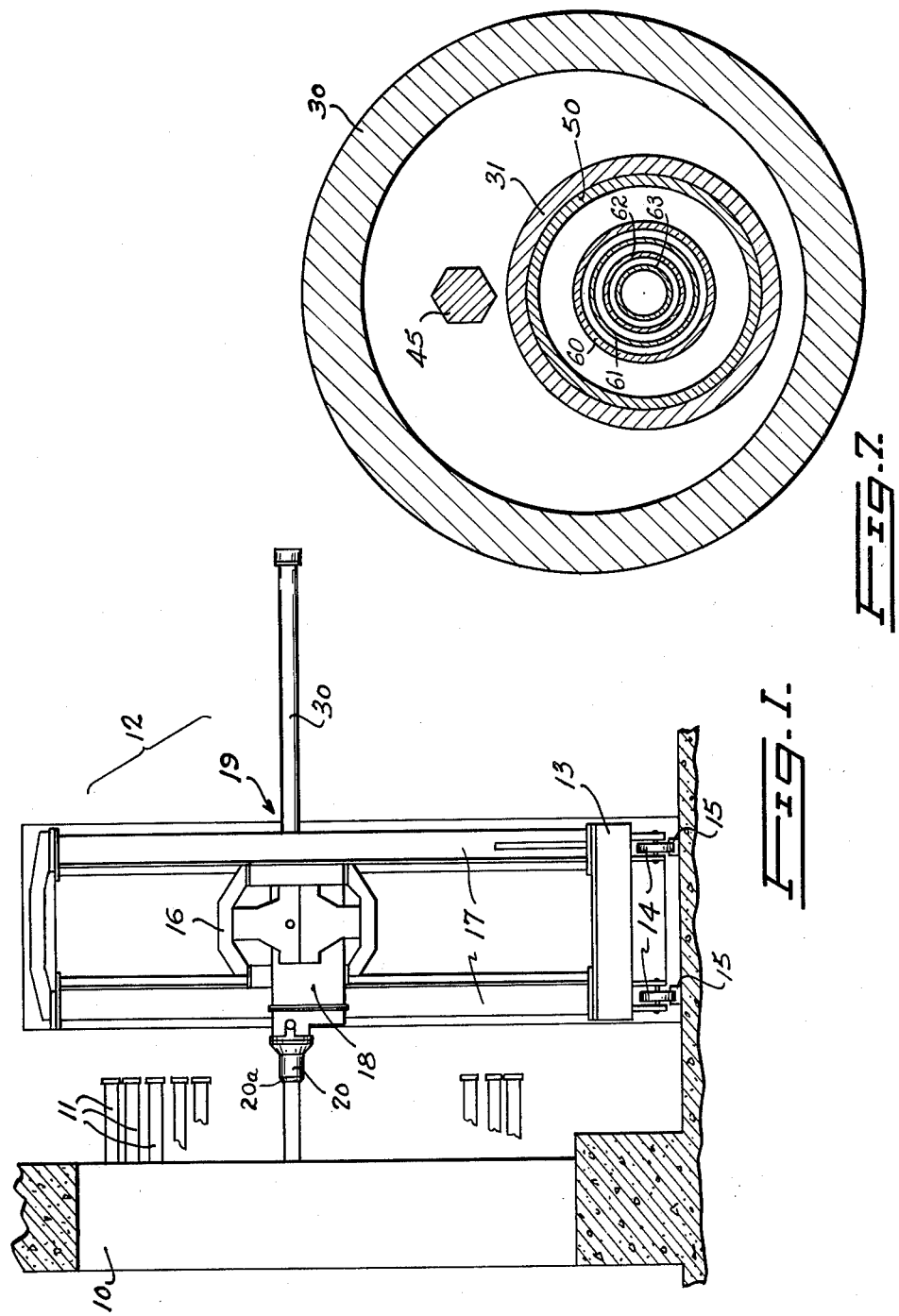

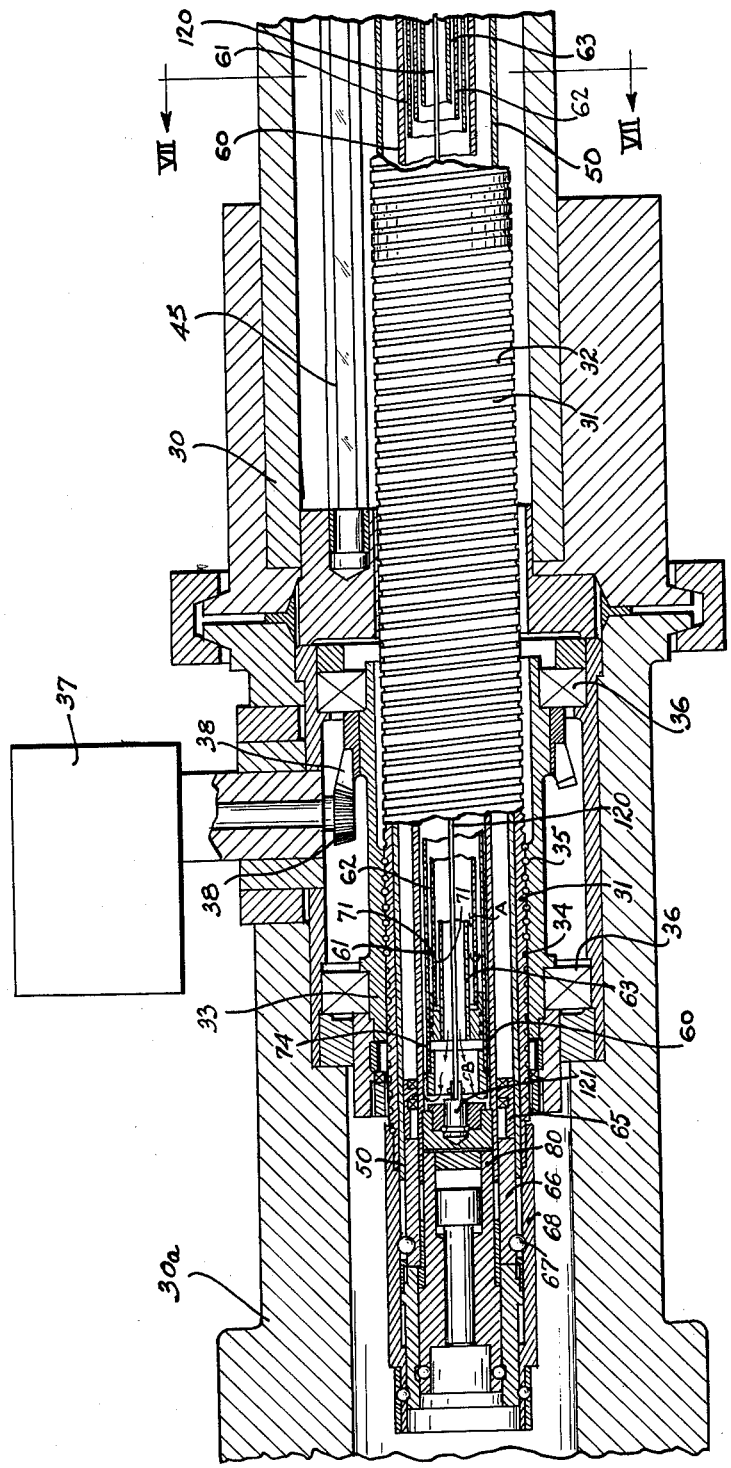

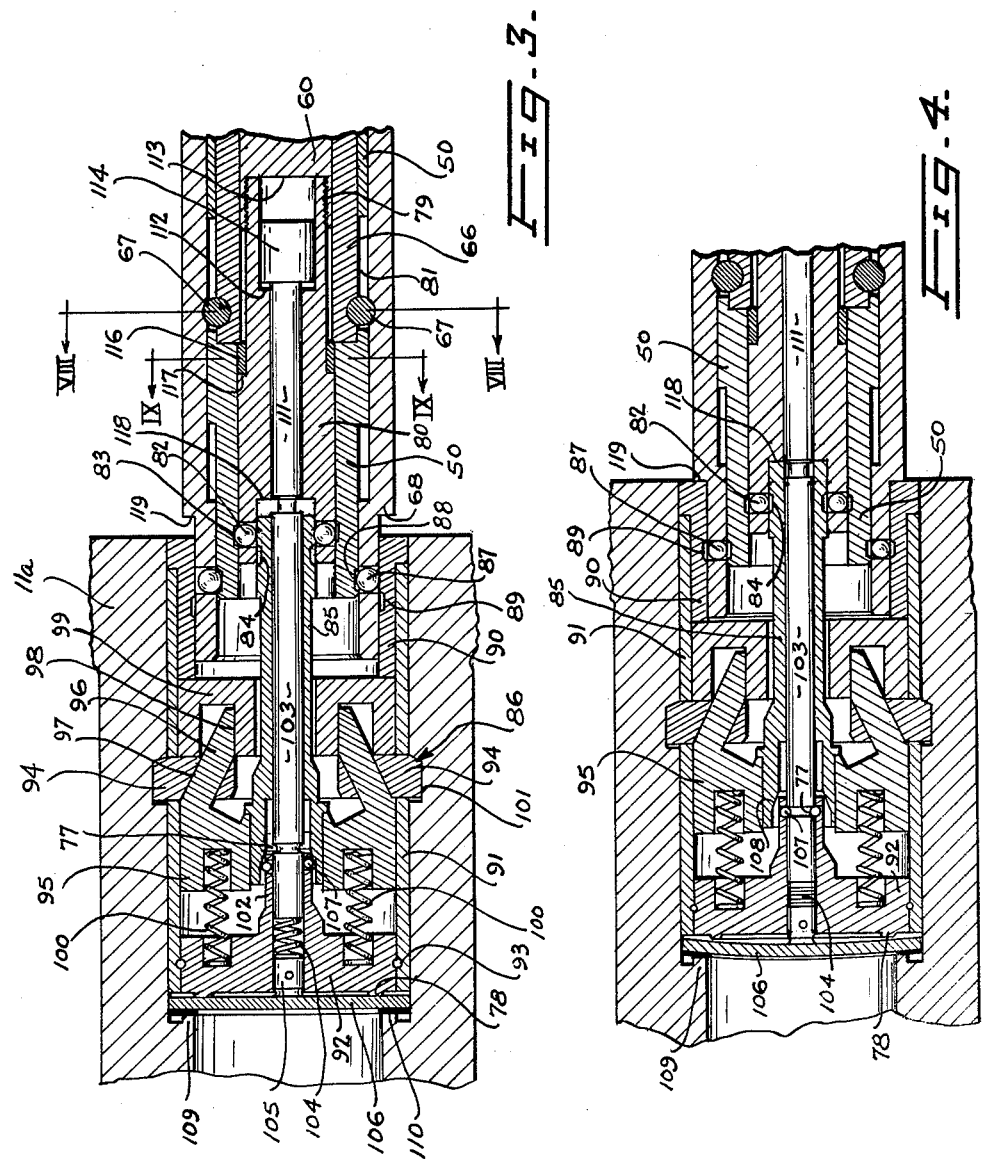

Nov. 17, 1964 F. S. HUMMEL 3,157,579
NUCLEAR REACTOR FUELING MACHINE
Filed March 5, 1962 6 Sheets-Sheet 5
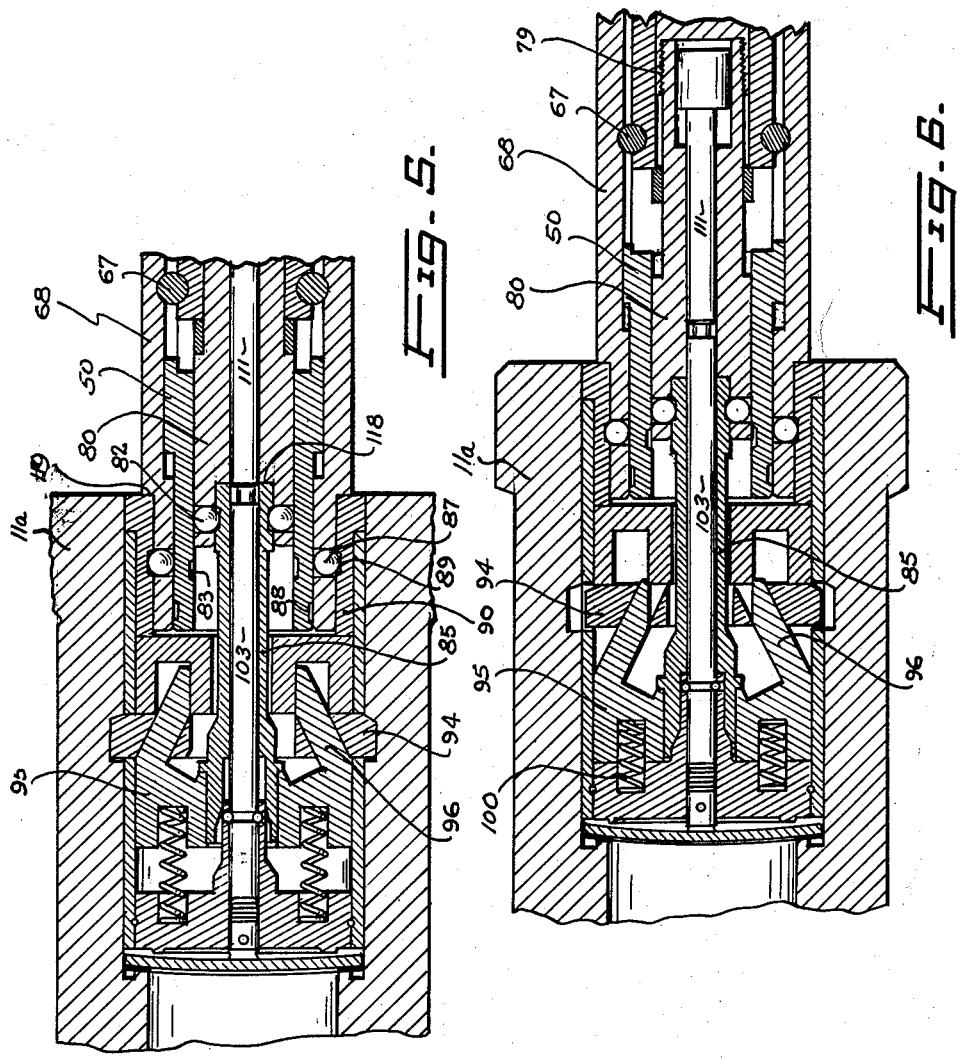

United States Patent Office 3,157,579
Patented Nov. 17, 1964

3,157,579
NUCLEAR REACTOR FUELING MACHINE
Frederick S. Hummel, Islington, Ontario, Canada, assignor to Atomic Energy of Canada Limited, Ottawa, Ontario, Canada, a corporation
Filed Mar. 5, 1962, Ser. No. 177,567
8 Claims. (Cl. 176—30)

This invention relates to fueling machines for nuclear reactors.

A typical nuclear reactor, in association with which the fueling machine to be described below could conveniently be used, has a large number of horizontal tubes each containing a series of fuel slugs or bundles and each arranged to convey fluid coolant under pressure past such bundles for the extraction of heat. Such an arrangement is conventional. Since the nuclear fuel in the bundles is slowly consumed, fresh bundles are loaded into the tubes on one side of the machine in accordance with a pre-arranged program, while used bundles are withdrawn from the opposite ends of the tubes at the remote side of the machine. Essentially similar machines are employed for loading and unloading.

The machine to be described in detail below is to be employed for loading, but it could equally well act as an unloading machine. It is even possible to interchange the functions of the machines once installed, although it is preferred normally to maintain the flow of bundles uni-directional across the reactor, as this facilitates handling, supply and disposal. Whether performing a loading or an unloading function, each machine is required firstly to form an extension of a reactor fuel tube and then to disengage a pressure sealing plug from the end of such tube. After equalising the pressure in the two machines with that of the coolant in the tube, the plugs in each end of the tube are removed, the ram of the loading machine is withdrawn, its magazine is indexed to position a new fuel bundle in line with the ram, and then the ram is forced forward to drive the bundle into the tube. At the same time the ram of the unloading machine is withdrawn at a controlled rate to allow a spent bundle to be pushed out of the far end of the tube by the general movement of bundles along the tube. The spent bundle is thus introduced into the magazine of the unloading machine for subsequent disposal. Finally the plugs are replaced at each end of the tube. A similar operation is then carried out with another tube. This description of the manner of operation of a loading machine (which term, for simplicity, is employed to include an unloading machine) has intentionally been made brief and general. In practice, the sequence of steps involved in a refueling operation is quite lengthy, but a detailed description of these steps would be out of place in this specification, since the inventive advance with which this specification is concerned involves improvements in the structure and operation of the ram mechanism and related parts of the fueling machine rather than in the overall method.

The primary object of the present invention is to provide a ram mechanism for a loading machine that will exhibit improvements in respect of reliability and certainty of operation, and will, at the same time, permit a high degree of flexibility in the performance of its necessary functions.

More specifically, it is an object of the present invention to provide a ram mechanism which, in addition to its ability to be extended to enter a fuel tube to ram a fuel bundle home, or to control the outward movement of a used bundle at the unloading end of the tube, can also perform the further functions of releasing a tube plug, withdrawing the same into the magazine, and finally returning the plug to the tube and again locking it in place.

In addition to being thus directed to a novel ram mechanism, the invention is concerned with a novel combination of ram mechanism and tube plug, and with the manner in which the ram mechanism cooperates with the plug for its removal from a tube and subsequent return thereto.

Further features of the present invention will appear from the specific description which follows, a description which is provided by way of example only of the present invention.

The manner in which the invention may be carried into practice is illustrated diagrammatically in the accompanying drawings.

FIGURE 1 is a general overall view in outline only of a fuel loading machine;

FIGURE 2a is the left hand part of a ram mechanism forming part of such machine and seen on a larger scale in central section;

FIGURE 2b is a continuation to the right of FIGURE 2a;

FIGURE 3 is a central section of the snout portion of such ram mechanism, on a further enlarged scale, and shown projecting into engagement with an end fitting of a reactor tube;

FIGURES 4 to 6 are views similar to FIGURE 3, each respectively showing the parts in different positions;

FIGURE 7 is a section on the line VII—VII of FIGURE 2a;

Figure 2:
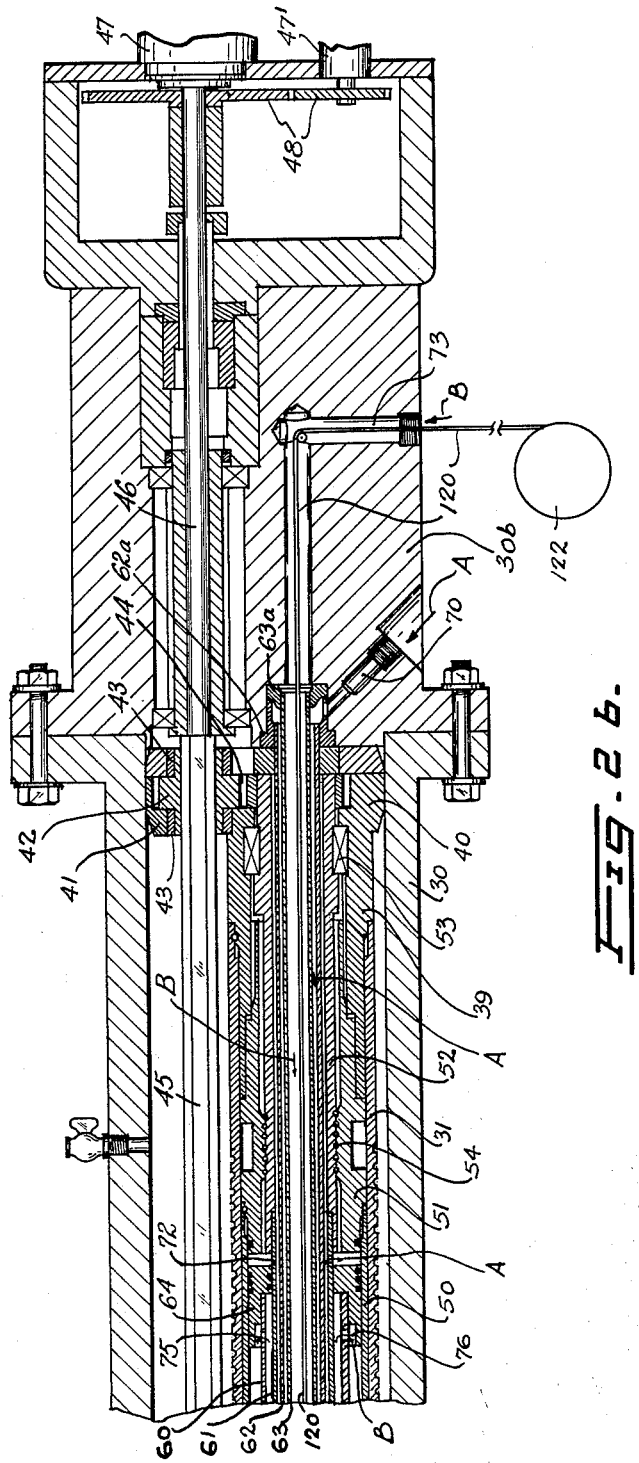

FIGURE 1 shows the function of the machine in general terms. A nuclear reactor 10 has a plurality of horizontal tubes 11 each containing a series of fuel bundles (not shown). The loading machine 12 comprises a frame 13 mounted on wheels 14 engaging rails 15 for rectilinear horizontal movement into alignment with a selected tube 11. Vertical indexing is achieved by mounting a carriage 16 on two vertical pillars 17. The magazine 18 and ram mechanism 19 are mounted on the carriage 16. Suitable motors and controls (not shown) are employed to align the snout 20 of the machine with any desired one of the tubes 11. Again, the details of these mechanisms are of no concern to the present invention.

The ram mechanism is shown in withdrawn position in FIGURES 2a and 2b. Essentially this mechanism consists of a casing structure 30 having a forward portion 30a which is secured to the housing of the magazine 18 (not shown in FIGURE 2a). The casing 30 houses an outer, mechanical ram and an inner, hydraulic ram. The mechanical ram consists of an elongated tube 31 provided on its outer surface with a helical groove 32. A rotatable sleeve 33 (FIGURE 2a) surrounds one end of the tube 31, and is formed on its inner periphery with a helical groove 34 which, for a short distance of the length of the tube 31, forms with the groove 32 a raceway in which a series of balls 35 are housed to provide a low friction bearing. A return passageway (not shown) in the sleeve 33 allows the balls to circulate freely around a closed circuit.

The sleeve 33 which is mounted in the casing structure by bearings 36 is rotated by a motor 37 through gearing 38. When the motor 37 turns, the sleeve 33 turns, and, since this sleeve is fixed longitudinally in the casing structure by the bearings 36, the tube 31 is propelled longitudinally within the sleeve, the tube being constrained against rotation by means later to be described. This longitudinal movement of the tube 31 represents the primary motion of the ram mechanism.

Before describing the secondary ram motion and the parts responsible therefor, reference will briefly be made to FIGURE 2b which shows the rear end of the tube 31 to which there is attached an end member 39 that performs a dual function. Firstly, it provides a downward projection 40 that supports the rear end of the tube 31 by sliding along the inside surface of the casing structure 30, and secondly it provides an upward projection 41 that houses a pinion 42 on bearings 43. The pinion 42 projects downwardly through the member 39 to mesh with the teeth of a second gear 44 the function of which will later be described. The pinion 42 is slidably mounted on a hexagonal shaft 45 with which it turns, its bore being of complementary hexagonal shape. An extension 46 of shaft 45 is driven by motor 47. A rotary potentiometer 47' is driven through gearing 48 to sense the position of the ram. It will thus be apparent that, as the tube 31 is advanced from the withdrawn position shown in the drawings, it carries the pinion 42 along with it for the full extent of the shaft 45 so that mechanical connection with the gear 44 is maintained.

In sliding engagement within the tube 31 there is mounted a latch tube 50 which, at its rear end (FIGURE 2b), is secured to an end member 51 which surrounds a rotatable cylinder 52 mounted in bearing 53 and carrying the gear 44 previously referred to. End member 51 and cylinder 52 are interconnected in a manner similar to that already described in connection with the parts 31 and 33, namely by complementary helical grooves in which a series of balls 54 can circulate. When cylinder 52 is rotated, end member 51 and latch tube 50 slide.

Figure 8:
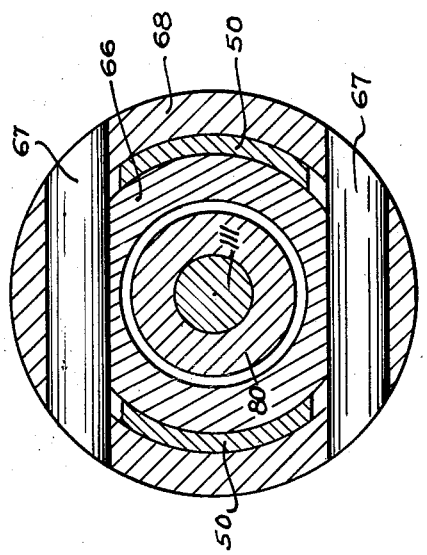
FIGURE 8 is a section on the line VIII—VIII of FIGURE 3.

Within the latch tube 50 again, there is situated a hydraulic ram assembly consisting of four concentric tubes, a main piston tube 60 and inner fluid supply tubes 61, 62 and 63. Tubes 62 and 63 are fixed by threaded sleeve 62a and collar 63a to the housing 30b which in turn is bolted to housing 30. The main piston tube 60 is secured at its rear end to a piston head 64 which is slidably mounted within the tube 50. This piston head 64 is free to travel the full length of the tube 50 towards the forward end of the mechanism, until it comes to rest against an end member 65 secured through a further member 66, pins 67 (see FIGURES 3 and 8) and a cylindrical outer snout member 68 to the main tube 31. During such sliding travel the tube 60 will have been advanced a corresponding distance forward in relation to the end member 65, by which it is slidingly supported, and hence in relation to the main tube 31. The piston head 64 is double-acting. Hydraulic fluid for moving it to the left in the drawings (to extend the ram) is supplied to its rear face from inlet 70, as indicated by arrows A, along the annular space defined between tubes 62 and 63, to pass through a series of orifices 71 in tube 62 (FIGURE 2a) and back along the annular space between tubes 62 and 61 to the piston head face through orifices 72 (FIGURE 2b). During this movement hydraulically operated ram tube 60 slides over a flat sided sliding member 74 (FIGURE 2a) secured to the end of tube 61. When either the hydraulically operated ram tube 60 or the mechanically operated ram tube 31 is extended, tubes 62 and 63 remain fixed, while tube 61 telescopes over tube 62. To move the piston head 64 to the right (to withdraw the ram) fluid is supplied, as indicated by arrows B, at inlet 73 to pass along the centre of tube 63 and around the flat sided sliding member 74 (FIGURE 2a) to return along the space between tubes 61 and 60 to orifices 75 (FIGURE 2b) in register with a cavity 76 situated on the left hand face of the piston head 64.

To summarise the main mechanisms described to this point: there is a mechanically operated sliding ram member consisting primarily of the tube 31; a mechanically operated sliding latch tube 50 within the tube 31; and a hydraulically operated sliding ram member consisting essentially of the tube 60, this tube in turn being housed within the latch tube 50 and tube 31.

Attention will now be transferred to the snout area of the apparatus, with particular reference to FIGURE 3 which shows this area after it has been brought into cooperating relationship with the end fitting 11a of a reactor tube 11. It is to be understood that there is a surrounding casing mechanism 20a (not fully shown) for establishing a water tight seal between the snout 20 of the machine (FIGURE 1) and the end fitting 11a of tube 11. This casing interconnection, which will be established by devices that are not of concern to the present invention, must, of course, be established and the pressures in the tube and machine must be equalised, before the snout of the ram mechanism can be extended to pass through the magazine 18 and into the position shown in FIGURE 3 where it is about to engage the tube plug and remove it from the end fitting. In this position of the ram mechanism, the mechanical ram is substantially extended while the hydraulic ram is substantially unextended.

Outer snout member 68 forms a solid continuation of mechanically operated ram tube 31, and inner snout member 80 forms a continuation of the hydraulically operated ram tube 60, being joined thereto by screw threads 79. The latch tube 50 continues into the snout, being formed with slots 81 to accommodate the pins 67. The forward ends of the three concentric members 80, 50 and 68 are provided with locking means in the form of two sets of locking balls. The first such set of balls 82 are housed in cavities in the inner snout member 80 and are of such diameter that they must project either radially inwardly or outwardly from such member. Normally, in the unlocked condition, they project outwardly into registering recesses 83 in the latch tube 50, or are free to do so whenever another set of recesses 84 formed in a central sleeve 85 of a tube sealing plug 86 are not in register with the balls 82. The second set of balls 87 are housed in cavities in the outer snout member 68 and are also of such diameter that they must project radially either inwardly or outwardly. In the unlocked condition they project (or are free to project) inwardly into registering recesses 88 in the latch tube 50, thus not engaging or at least not forcibly engaging a further set of recesses 89 formed in a rim member 90 of the plug 86.

Such a plug 86 acts to close off the end fitting 11a of each reactor tube 11. It comprises an outer shell 91 to which the rim member 90 is secured; an end plate 92 secured to the shell 91 by pins 93; a set of jaws 94 (conveniently six in number) which are mounted in the shell 91 for sliding movement radially between the extended (locked) position shown in FIGURE 3 and the withdrawn (unlocked) position of FIGURE 6. Such movement is controlled by a spider 95 secured to sleeve 85 and having a plurality of mutual convergent legs 96, each such leg cooperating to control a respective jaw 94 by passing through an inclined slot 97 therein. Flat end faces 98 on legs 96 slide on a surface of an annular member 99 of U-shaped section secured within the shell 91. A number of coil compression springs 100 extend between the end plate 92 and the spider 95 urging the latter to the right as seen in FIGURE 3, and hence holding the jaws 94 out in their extended positions in which they project into an annular latching groove 101 formed in the inside surface of the end fitting 11a.

A boss 102 on the end plate 92 is formed with a central aperture into which there extends the forward end of a plug rod 103. At such forward end a coil compression spring 104 extends between the rod 103 and a hub 105 of a flexible sealing disc 106. The end plate boss 102 is formed with cavities housing a series of locking balls 107 that normally project radially outwardly to engage an inclined annular surface 108 and thus lock the spider 95 against movement to the left and hold the jaws 94 in their extended (locked) position. This condition can only be released by leftward movement of rod 103 to bring groove 77 therein into register with balls 107 (see FIGURES 4 to 6).

An annular bearnig projection 78 on the end plate 92 presses against the rear surface of the sealing disc 106, the forward surface of which bears against an annular seating surface 109 formed inside the end fitting 11a, with an annular gasket 110 interposed. It will be observed that the projection 78 bears on the disc 106 at points displaced radially inwardly from the area of engagement between the disc 106 and the seating surface 109. A sealing arangement of this type is disclosed in W. H. Bowes United States Patent No. 2,948,959, issued August 16, 1960. Its manner of operation will become apparent from the description that follows.

Figure 9:
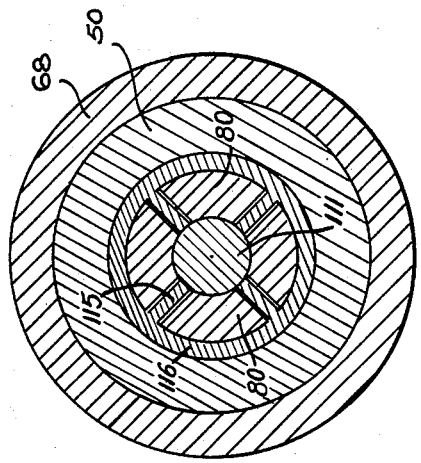
FIGURE 9 is a section on the line IX—IX of FIGURE 3.

While the rear end of the rod 103 is supported in the boss 102 of the end plate 92, its forward end is supported in the sleeve 85. Returning again to consideration of the snout area of the ram mechanism, a similarly centrally situated snout rod 111 is slidably mounted in the inner snout member 80 in alignment with rod 103. Sliding travel of rod 111 in member 80 is limited by surfaces 112 and 113 of the members 80 and 60 respectively, co-operating with an enlarged head 114 on rod 111. As also seen from FIGURE 9, rod 111 is connected by radial arms 115 to a ring 116 which lies against a shoulder 117 on the snout member 80 while abutting the end of member 66.

FIGURE 3 shows the position of the snout of the ram mechanism at the moment when it has moved to the left just sufficiently to come into contact with the plug 86. Member 80 has slid over the end of the central sleeve 85 of the plug 86 and the ends of rods 103 and 111 have come together in abutting relationship. Shoulder 118 on member 80 has not yet contacted the end of sleeve 85, and similarly, although the outer snout member 68 has moved into sliding engagement within the rim member 90 of the plug shell 91, its shoulder 119 is also not yet in contact with the end of such rim member.

Continued leftward movement of the ram mechanism as a whole, which will be brought about by driving the mechanical ram (tube 31) to the left by motor 37, causes outer snout member 68 and hence member 66 to act through ring 116 and arms 115 to push rod 111. This rod pushes rod 103 and bows the sealing disc 106 in the manner seen in FIGURE 4. For the purpose of illustration this bowing action has been somewhat exaggerated in FIGURES 4 to 6. In reality it is quite slight, but it is nevertheless sufficient to transfer the force maintaining the sealing pressure between disc 106 and seating surface 109 from the bearing projection 78 on the end plate 92 to rod 103. During this operation spring 104 is compressed. FIGURE 4 also demonstrates that this leftward movement of rod 103 aligns groove 77 on rod 103 with balls 107 allowing the latter to move radially inwardly under pressure from surface 108 whenever the latter moves to the left. The spider 95 has thus been unlocked. At the same time balls 82 and 87 have been brought into alignment with recesses 84 and 89 respectively. The limit of this movement is defined by shoulders 118 and 119 which come to bear against the sleeve 85 and the rim member 90 respectively.

The next action which takes place is for the ram mechanism to lock its snout onto the plug. This is accomplished by a leftward sliding movement of the latch tube 50 which, as has already been explained, is secured to the end member 51 (FIGURE 2b) and is controlled by motor 47. FIGURE 5 shows how this movement produces misalignment between recesses 83 and balls 82, and between recesses 88 and balls 87, thus forcing the respective sets of balls into recesses 84 and 89 and locking the inner and outer snout members 80 and 68 respectively to the sleeve 85 and the rim member 90 of the plug 86. The snout members and plug members are thus locked together.

There now remains for the jaws 94 to be withdrawn in order to disengage the plug from the end fitting. This is accomplished by movement of the inner (hydraulic) ram constituted primarily by the tube 60. This movement which takes place independently of the outer parts and, in particular, independently of the outer snout member 68 which is locked to the plug shell 91, is transmitted through the inner snout member 80 in the manner demonstrated by FIGURE 6. Sleeve 85 is consequently moved to the left and it carries the spider 95 with it. Legs 96 thus slide in and withdraw jaws 94. The plug is thus released and is free to be withdrawn from the end fitting, an action which is accomplished by withdrawing the mechanical ram, member 68, to which the plug shell 91 is locked, while maintaining the hydraulic ram advanced.

The mechanical ram mechanism will then be retracted to bring the plug 86 into the magazine 18. There, the plug will be disengaged by the snout members by a series of operations the reverse of those just described; the ram will then be further retracted to be withdrawn from the magazine; the magazine will be indexed around to remove the plug from alignment with the ram mechanism and to position a new fuel bundle in such alignment; and the ram mechanism will then be extended again (firstly by extending the mechanical ram and then by extending the hydraulic ram within the mechanical ram) to push the fuel bundle out of the magazine and into and beyond the end fitting 11a to pass into the tube 11 proper. It is only during this latter movement that the hydraulic ram is extended to any appreciable extent, although it is moved by small amounts during the plug releasing operation described above.

When the new bundle has thus been forced the required distance into the tube 11, and, as already explained, this operation will be coordinated with a complementary unloading operation by a similar machine at the other end of the tube 11, the ram mechanism is again fully retracted and the sequence of operations is repeated in reverse: magazine indexed; plug recovered by snout of ram mechanism; ram mechanism extended to place plug in end fitting; plug locked in place by differential movement of snout members to allow jaws 94 to project again into latching groove 101 of end fitting; and finally snout members unlocked from plug members and ram mechanism withdrawn in preparation for the machine to be realigned with another tube 11.

To enable the exact position of the snout to be known, more particularly when nearing full extension of the hydraulic ram mechanism during insertion of a fuel bundle into a tube 11, a flexible tape 120 is provided having its free end secured by fitting 121 to the main hydraulic piston tube 60 and hence to the inner snout member 80. Tape 120 is wound into casing 122 which includes a spring maintaining tension in the tape.

I claim:
1. In combination,
   (a) a nuclear reactor having at least one fuel tube and a sealing plug sealing an end of said tube, said plug having respective inner and outer coaxial members axially movable relative to each other and means locking said plug to said tube end, said locking means being connected to said plug members for operation by said relative movement,
   (b) and a fueling machine for said reactor, said machine including a ram mechanism comprising
      (i) an outer, tubular ram member terminating in an outer snout member for engagement with said outer plug member,
      (ii) an inner ram member terminating in an inner snout member for engagement with said inner plug member,

(iii) means mounting said ram members coaxially with each other, (iv) means for moving said ram mechanism relative to said machine to bring said outer snout member into engagement with said outer plug member and said inner snout member into engagement with said inner plug member, (v) further locking means mounted on said inner and outer snout members for locking said outer snout member to said outer plug member and for locking said inner snout member to said inner plug member, (vi) an elongated latch member mounted coaxially between said ram members, (vii) means for moving said latch member longitudinally relative to said ram members to actuate said further locking means and thereby establish locking engagement between said outer snout and plug members and between said inner snout and plug members, (viii) and means for moving said inner ram member longitudinally relative to said outer ram member to move said inner plug member relative to said outer plug member and operate the first-mentioned locking means to release the plug from the tube end.

2. The combination of claim 1, wherein said outer plug member includes a hollow rim portion within which the outer snout member engages for locking engagement therewith and said inner plug member includes a central sleeve over which the inner snout member engages for locking engagement therewith.

3. The combination of claim 1, wherein the moving means (viii) associated with the inner ram member includes means for moving said inner ram member to project beyond said outer ram member to form therewith an extended ram for propelling a fuel bundle into the reactor tube.

4. The combination of claim 1, including a snout rod mounted coaxially within said inner snout member, a plug rod provided within the inner member of the plug in register with said snout rod, a sealing disc of the plug, acted on by said plug rod, and means interconnecting said snout rod with said outer ram member whereby, on movement of said outer ram member to bring its outer snout member into engagement with the outer plug member, said snout rod is urged against said plug rod to bow said sealing disc preparatory to unlocking of the plug from the reactor tube.

5. In a nuclear reactor installation in which the reactor has a series of horizontal fuel tubes sealed by sealing plugs, the combination of such a plug with a ram mechanism of a fueling machine, said plug comprising (a) an outer shell engaged in an end of a said tube, (b) extensible means mounted in said shell in locking engagement with said tube, (c) spring means normally holding said extensible means in extended condition, (d) a central sleeve slidably mounted within said shell, (e) means connected to said sleeve engaging said extensible means to overcome said spring means and withdraw said extensible means from locking condition upon sliding of said central sleeve, (f) a fluid pressure tight sealing disc normally held in pressure engagement with a seating surface on said tube by said shell, (g) and a plug rod slidably mounted within said central sleeve engaging said sealing disc centrally to bow said disc and hold the same against said seating surface independently of said shell, and said ram mechanism comprising (h) a outer tubular ram member terminating in an outer snout member, (i) an inner tubular ram member mounted coaxially within said outer ram member and terminating in an inner snout member, (j) further locking means mounted on said inner and outer snout members for locking said outer snout member to said plug shell and for locking said inner snout member to said central sleeve, (k) a tubular latch member mounted coaxially between said ram members for actuation of said locking means, (l) a snout rod mounted within said inner snout member to cooperate with said plug rod, (m) means interconnecting said snout rod with said outer ram member, (n) means for moving said outer ram member longitudinally to project its associated snout member into engagement with the shell and to urge said snout rod against said plug rod to bow said sealing disc while simultaneously moving said inner ram member into engagement with said central sleeve, (o) means for moving said latch member to actuate said further locking means to establish locking engagement between said outer snout member and said shell and between said inner snout member and said central sleeve, (p) and means for moving said inner ram member relative to said outer ram member to move the central sleeve of the plug relative to the shell of the plug to withdraw said extensible means from locking condition to disengage the plug from the tube for subsequent withdrawal by operation of the moving means associated with said outer ram member.

6. The installation of claim 5, wherein the moving means (p) associated with the inner ram member includes means for moving said inner ram member to project beyond said outer ram member to form therewith an extended ram for propelling a fuel bundle into the tube.

7. The installation of claim 5, wherein said plug includes still further locking means mounted on said central sleeve for locking the same against movement relative to said shell, and means associated with said plug rod for release of said further locking means upon movement of said plug rod by the snout rod to bow the sealing disc.

8. In combination, (a) a nuclear reactor having at least one fuel tube and a sealing plug sealing an end of said tube, said plug having (i) a pair of members axially movable relative to each other, (ii) means locking said plug to said tube end, said locking means being connected to said plug members for operation by said relative movement, (iii) a sealing disc, (iv) and a plug rod bearing against said sealing disc, (b) and a fuelling machine for said reactor, said machine including a ram mechanism comprising (v) a pair of ram members terminating in respective snout members for engagement with respective said plug members, (vi) means for moving said ram mechanism relative to said machine to bring said snout members into engagement with said respective plug members, (vii) further locking means mounted on said snout members for locking each snout member to its respective plug member, (viii) a latch member and means for moving said latch member relative to the ram members to actuate said further locking means and thereby establish locking engagement between each snout member and its respective plug member, (ix) a snout rod supported by one of said snout members in register with said plug rod, (x) means interconnecting said snout rod and one of said ram members whereby on movement of means (vi) to bring the snout members into engagement with the plug members, said snout rod is urged against said plug rod to press said sealing disc preparatory to unlocking of the plug from the reactor tube, (xi) and means for moving one ram member relative to the other ram member to move one plug member relative to the other plug member and operate locking means (ii) to release the plug from the tube end.

References Cited in the file of this patent
UNITED STATES PATENTS

| | | |
|---|---|---|
| 2,725,993 | Smith | Dec. 6, 1955 |
| 2,752,183 | Doll | June 26, 1956 |
| 2,837,370 | Stott et al. | June 3, 1958 |
| 2,888,294 | Savarieau | May 26, 1959 |
| 2,984,612 | Hackney et al. | May 16, 1961 |